(12) United States Patent
MacIssac et al.

(10) Patent No.: US 6,643,659 B1
(45) Date of Patent: Nov. 4, 2003

(54) COMMON DATA MODEL INCLUDING FIELD INTERDEPENDENCIES

(75) Inventors: Brian MacIssac, Kanata (CA); David Simser, Kanata (CA)

(73) Assignee: Mitel Knowledge Corporation, Kanata (CA)

( * ) Notice: Subject to any disclaimer, the term of this patent is extended or adjusted under 35 U.S.C. 154(b) by 246 days.

(21) Appl. No.: 09/695,214

(22) Filed: Oct. 25, 2000

(30) Foreign Application Priority Data

Oct. 26, 1999 (GB) .............................................. 9925175

(51) Int. Cl.$^7$ .............................................. G06F 17/30
(52) U.S. Cl. ...................... 707/100; 707/101
(58) Field of Search ................ 707/100, 101, 707/102, 104, 523

(56) References Cited

U.S. PATENT DOCUMENTS

| | | | |
|---|---|---|---|
| 5,021,995 A | 6/1991 | Quint et al. | 707/101 |
| 5,557,790 A | 9/1996 | Bingham et al. | 707/101 |
| 5,708,828 A | 1/1998 | Coleman | 707/523 |

FOREIGN PATENT DOCUMENTS

| | | | | |
|---|---|---|---|---|
| WO | EO 96/371817 | 11/1996 | ............ | G06F/17/30 |

*Primary Examiner*—Sanjiv Shah
(74) *Attorney, Agent, or Firm*—Marks & Clerk

(57) ABSTRACT

A method is disclosed for managing data from a variety of sources, where each source provides its own API (Application Programming Interface). A data management layer containing metadata describes entities in each source by collating the metadata and presenting it in generic form. An upper level view controller communicates with the data management layer to manage the data from the different sources.

5 Claims, 1 Drawing Sheet

COMMON DATA MODEL INCLUDING FIELD INTERDEPENDENCIES

FIELD OF THE INVENTION

This invention relates to method of managing data from a variety of sources.

BACKGROUND OF THE INVENTION

There are situations where data exists in multiple data stores, each having its own Application Programming Interface (API), which is a set of functions available for the programmer to use to program applications, and where is it desired to have its generic view of the data from the diverse stores. A typical example of the situation arises in the field of telephony, where the underlying data stores contain telephony information, such as telephone numbers, hunt groups, and the like.

Typically each data source, which may include commercial data bases, has its own API, and it is not possible to provide generic access to the data in the stores without the upper layers having specific knowledge of the API of each individual data source. This makes the upper layers complex to implement.

An object of the invention is to alleviate this problem.

SUMMARY OF THE INVENTION

According to the present invention there is provided a method of managing data from a variety of sources, each source providing its own API (Application Programming Interface), comprising the steps of providing a data management layer containing metadata describing entities in each source, said data management layer collating said metadata and presenting it in generic form and providing an upper level view controller communicating with said data management layer to manage the data from different said sources.

The invention thus provides an abstract layer of arbitrary data sources by describing a generic data model and API representing an access in the data. The data model is primarily aimed at providing a data description that is friendly to a user interface.

The invention provides a generic metadata description and an associated API, and a generic representation for field interdependencies. Metadata is of course data about data.

The invention is flexible in that it allows the addition of new field types, the ability to describe more complex data structures, and the ability to describe more complex field interdependencies than before.

The invention may be used, for example, to provide access to Mitel product data bases including, for example, symbol, iPBX, new core control, etc. It can be implemented on a general purpose computer suitably programmed for the purpose.

The invention thus provides a generic view of the data from the diverse data stores, as well as providing infrastructure for managing future data stores including commercial data bases. The invention provides generic access to data without the upper layers requiring specific knowledge of the API of each individual data store.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
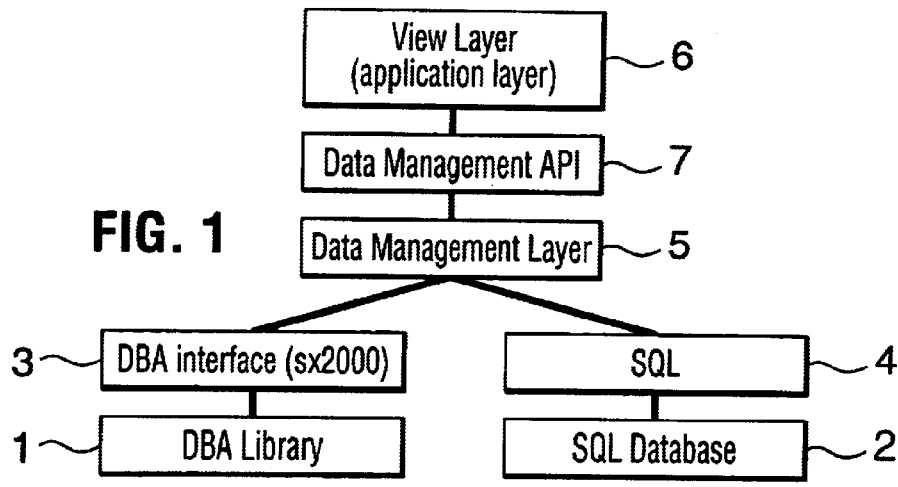
FIG. 1 is a block diagram showing the structure of the data model in accordance with the present invention.
Figure 2:
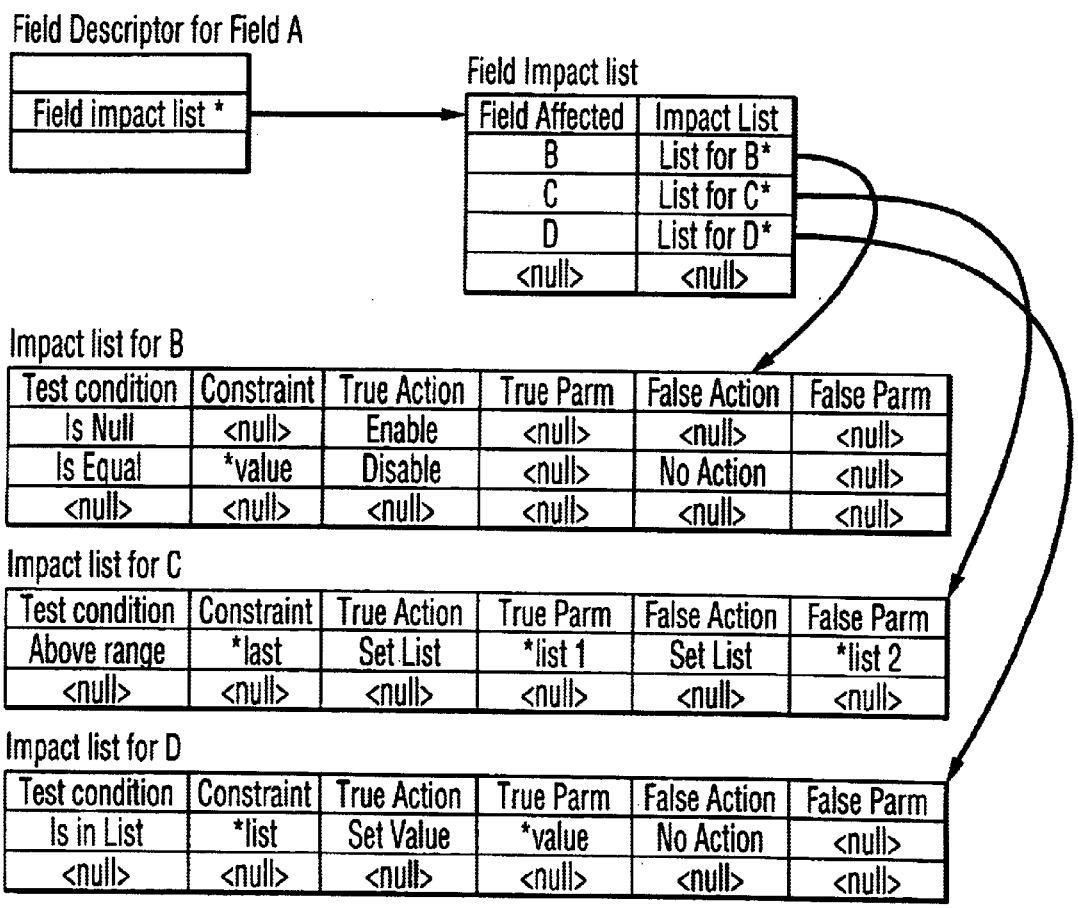
FIG. 2 is a diagram illustrating the generic representation of field interdependencies.

In FIG. 1, the generic model comprises data sources 1 and 2, each having respective interfaces 3, 4. In this example, the data source 1 is DBA library and the data source 2 is an SQL database. Interface 3 provides an API for DBA library 1 and SQL server 4 provides an interface for SQL database 2.

Interfaces 3 and 4 communicate with data management layer 5, which in turn communicates with view layer 6 through data management API 7. The data management API 7 performs a set of functions that the upper view controller 6 can use to manage the data from the different sources 1, 2. These functions include the following:

Session control (connection)

Get list of views

Get view descriptions

Get field descriptions

Translate enumeration (language dependant)

Get field dependencies

Read/Write data functions

Transaction control

The data management layer 5 contains the metadata to describe entities, such as products, views, fields, and interdependencies for each data source that it manages. This metadata is provided by the underlying data base access systems for the various data sources. The prime responsibility of the data management layer is to collate the metadata and present it to the upper layers in generic form. The data management layer contains metadata to describe the following entities:

Products—the DML must be able to differentiate between the various product types.

Views (tuples)—A view is a readable/writable collection of fields from a database. A view contains fields that are viewable by a user such that an application can display all of the fields within the view in a manner that make sense to the user. A view can contain fields that are read-only. That is, a field can be displayed but not edited by a user.

Fields—A field is the smallest entity within a database. It must be representable by a native data type (i.e. it cannot represent a structure—e.g. a list)

Field Groups—This is a logical grouping of two or more fields within a single view (e.g. PLID). The grouping is logical and does not impose a GUI display concept.

Field Interdependencies—This is a list of rules that an application can follow to provide more guidance to a user.

Data is represented within the data management layer in native format. The upper layers have the option of extracting the native format of fields or string representations of the native format.

Since the data management layer manages several data sources, the view and field descriptions are product specific. The lower level data access layers (e.g. DBA) must provide a description of the product type that is managed by that layer. At this point the product description can simply be a product enumeration value. For example, Product Types
  SX2000 light
  Symbol
  IPBX The view layer 6 provides a view, which is a readable/writable collection of fields from a database. A view contains fields that are viewable by a user such that an application can display all of the fields within the view in a manner that make sense to the user. A view can contain fields that are read only. That is, a field can be displayed but not edited by a user.

A view has of the following attribute:

View Name—A string that is displayable in a GUI that identifies the view.

View ID—An integer value that uniquely identifies the view within the database.

A view ID does not have to be unique across the entire DN1L.

View Type

List of Fields—list of fields contained within the view.

Operation Supported

List of Field Groups

Parent View

Child View

The view type attribute is an extensible enumeration of view types. A view must be one (and only one) of the following types:

Normal—not one of the others.

Singleton—only one tuple of the view exists within the database (e.g. System options)

Compressed list—One key field within the view can be changed by the underlying database as tuples are added and deleted.

Fixed list—No records can be added or deleted. A fixed number of records are allocated by the underlying system.

An operations supported attribute enumerates the allowable operation for the particular view. A view can support one or more of the following operations (on none for that matter, thereby defining a read only view):

Insert (Add)

Delete

Update (Modify)

In some cases two views may have a parent child relationship. For example, the Hunt Group form in the Mitel Sx2000 is comprised of an Info view and a Data view. This relationship is described by the Parent and Child view attributes. If a view has a child view then the Child View attribute contains the view ID of the child view. If a view has a parent then the Parent attribute contains the View ID of the parent view. A view can only have one child or parent and cannot be both a child and a parent.

A field is the smallest unit within database. It must be representable by a native data type. A field is described by the following attributes:

Field Type

Field Kind

Field ID

Size (length)

Min/Max values

Field Name.

Enumeration translation

Field interdependencies

A field type attribute is an extensible enumeration of different types. A field must be one (and only one) of the following field types:

Arbitrary String—no restrictions on characters allowed

Telephony String—only the characters 0–9, *, and # are allowed.

Telephony Numeric String—the characters 0–9, *, and # are allowed OR the first char can be T' followed by the characters 0–9.

Name String—All characters are allowed (a–z, A–Z, 0_9,!@#$%A&( )□<>. with the following exceptions: one comma "," is allowed and it is interpreted as a delimiter between the first and last names and not included as the actual string. The vertical bar "|" is disallowed as it is used as a delimiter in z300. The string length cannot exceed maximum characters defined by the Field size attribute not including a comma delimiter.

Alphabetic String—only a–z, A–Z (no numeric). (Currently not used on sx2k but is here for consistency.)

Numeric String—only characters 0–9 are allowed.

Alphanumeric String—only a–z, A–Z, 0–9. No punctuation characters.

Integer

Enumeration

Symbolic set—equivalent to Pascal sets. This one is for string based set members (e.g. days of the week, Mon, Wed, Tues–Thurs)

Numeric set—equivalent to Pascal sets. This one is for numeric based set members (e.g. COR groups, "2,4,7, 19–24,35")

A field kind attribute is a bit field list of field kinds. A field can be one or more of the following field kinds:

Key—The field is a key field in the tuple.

Read/write—the field is editable by a user.

Linked—The key that is linked to a parent or child view.

Secondary Key (new name please)—The field is a key for write operations.

Within a view, a grouping of fields can be described. These grouping are logical groups of fields within the view. It is an indication to an application that some fields are associated. A field group does not impose a specific GUI (Graphical User Interface) look and feel. Lists of these field groupings are contained within the description of the associated view.

A Field group consists of the following attribute:

Field group name—a string that can be displayed by a GUI.

Group Type

List of Field ID that are in the group (or pointers to the field descriptions)

A group type attribute is an extensible enumeration of group types. A group must be one of the following types:

Ordered—the order of the field ids within the group represents a logical ordering of the fields (e.g. PLID is cab, shelf, slot, circuit in that order). This is a cue to an application that may indicate a GUI look and feel.

Non-ordered—the order of the fields in the group is unimportant.

Field interdependencies are rules that a GUI may wish to respect when managing a user's actions. When a user is operating on a field, the application may want to know if the user's actions affect other fields. In this context, a field may have an impact on other fields within the same view. The application needs to know two things, it needs to know what other fields a particular field affects and what action to take.

In order to describe field interdependencies each field within a view can have a field impact list.

A field impact list contains one or more field impact items. A field impact item contains the following elements:

Impacted field ID—the ID of the field that is impacted by this field

Test Condition—An enumerated value of the condition to test to determine the appropriate action.

Test Condition Constraint—a pointer to a constraint for the test

Action if True—the action to take is the test condition is true

Action if True parameter—a pointer to a parameter for the true action

Action if False—the action to take if the test condition if false

Action if False parameter—a pointer to a parameter for the false action A test condition enumeration consists of the following:

Is NULL—the field contains a null value. The test condition constraint is NULL.

Is Above Range—this test is applicable for enumerated or integer values only.

The test condition is true if the field value is above the value pointed to by the test constraint. In the case of an enumerated value the test constraint points to a value that is the highest in position within a sub-list of enumerated values (i.e. not necessarily the highest valued enum in terms of integer value). In the case of an integer the constraint is a max value.

Is Below Range—this test is applicable for enumerated or integer values only. The test condition is true if the field value is below the value pointed to by the test constraint. In the case of an enumerated value the test constraint points to a value that is the lowest in position within a sub-list of enumerated values (i.e. not necessarily the lowest valued enum in terms of integer value). In the case of an integer the constraint is a min value.

Is Equal—this test is applicable for enumerated or integer values only. The test condition is true if the field value is equal to the value pointed to by the test constraint. (Could be used for sting type too)

Is In List—this test is applicable for enumerated values only. The test condition is true if the field value is in the list pointed to by the test constraint.

An action enumeration consists of the following:

NULL—continue checking

No Action

Enable—the field affected should be enabled.

Disabled—the field affected should be disabled.

Set List—applicable for enumerated fields only. Set the field affect to the list of enumerations pointed to by the associated Action parameter.

Clear Value—clear the affected field

Set Value—set the value of the affect field to that value pointed to by the associated Action parameter.

Set Value and Enable—set the value of the affect field to that value pointed to by the associated Action parameter and enable the field.

Set Value and Disable—set the value of the affect field to that value pointed to by the associated Action parameter and disable the field.

It will thus be seen that the invention provides a generic data model that allows the user to access multiple diverse data sources without the need for a specific knowledge of the API of each data source.

We claim:

1. A method of managing data from a variety of data sources, comprising the steps of:

providing a plurality of said data sources, each said data source having an Application Programming Interface (API);

providing a data management abstraction layer to receive data from said data sources and containing metadata describing entities in cach said source including Views, Fields and Field interdependencies providing a list of rules that a graphical user interface will respect when managing a user's actions, said data management layer collating said metadata and presenting it in generic form;

providing a data management API (Application Programming Interface) above said data management layer to receive said metadata and perform a set of functions including session control, Get list of views, Get field dependencies; and providing an upper level view controller communicating with said data management API to manage the data from different said sources and present a view thereof.

2. A method as claimed in claim 1, wherein said set of functions also includes Get view descriptions, Get field descriptions, Translate enumeration, Read/Write data functions, and Transaction control.

3. A method as claimed in claim 1 or 2, wherein said metadata also describes entities including: Products and Field Groups, and Field Interdependencies.

4. A method as claimed in claim 1, wherein a field has a field impact list within each view.

5. A method as claimed in claim 1, wherein said data sources contain telephony data.

* * * * *